May 26, 1942.  P. A. SPERRY  2,284,307
METHOD OF SLITTING SHOE SOLES
Filed Jan. 24, 1941   2 Sheets-Sheet 1
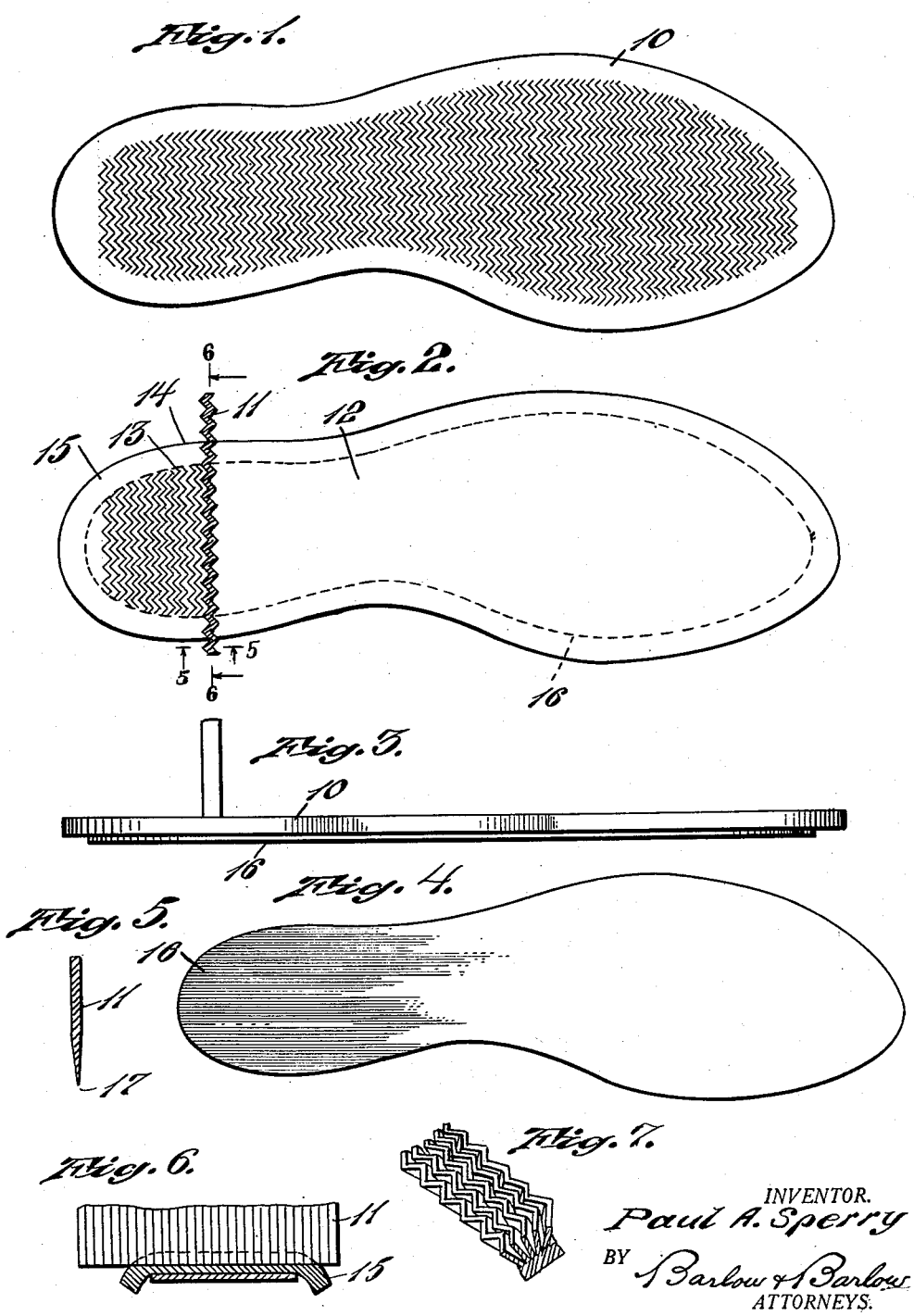
INVENTOR.
Paul A. Sperry
BY Barlow & Barlow
ATTORNEYS.

May 26, 1942.  P. A. SPERRY  2,284,307
METHOD OF SLITTING SHOE SOLES
Filed Jan. 24, 1941    2 Sheets-Sheet 2

INVENTOR.
Paul A. Sperry
BY Lester J. Dudley
ATTORNEY

Patented May 26, 1942

2,284,307

UNITED STATES PATENT OFFICE 2,284,307

METHOD OF SLITTING SHOE SOLES

Paul A. Sperry, New Haven, Conn., assignor to United States Rubber Company, New York, N. Y., a corporation of New Jersey Application January 24, 1941, Serial No. 375,779
In Canada January 31, 1940

2 Claims. (Cl. 12—146)

This invention relates to the method of making a shoe sole, and has for one of its objects the provision of a novel and simple method of providing cuts in the shoe sole of a character enabling the sections between the cuts to flex readily for the gripping of the surface upon which the shoe contacts.

Another object of the invention is the provision of a simple method for forming an uncut marginal edge about the periphery of the shoe sole thereby making it unnecessary to provide costly cutters of varying lengths for the provisions of this uncut area.

Another object of this invention is to provide an improved method of cutting the tread surfaces of rubber or rubber composition sole shoes in some areas by the use of a reciprocating knife which has a cutting edge of a predetermined length and so cooperates with a supporting anvil for the sole that cuts of different length for individual reciprocations are made.

With these and other objects in view, the invention consists of certain novel features of construction, as will be more fully described, and particularly pointed out in the appended claims.

In the accompanying drawings:

Fig. 1 is a bottom plan view of the cut shoe sole complete;

Fig. 2 shows the shoe sole and cutter in section in its relation to the sole and anvil shown in dotted lines in performing a cut;

Fig. 3 is a side elevation of the structure shown in Fig. 2 illustrating the anvil beneath the sole;

Fig. 4 is a plan view of the anvil piece alone;

Fig. 5 is a sectional view of the cutter;

Fig. 6 shows the cutter as performing a cut;

Fig. 7 shows a perspective view of a section of the material after the same has been cut;

Figure 8:
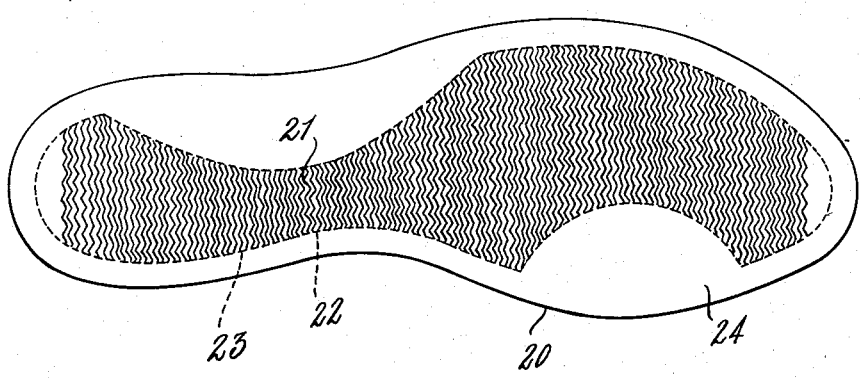
Fig. 8 is a plan view of a shoe sole and an anvil of irregular shape shown in dotted lines supporting the sole which has been slit or cut in the areas supported.

Difficulty is often experienced in the cutting of soft rubber to a desired dimension due to its substantial elasticity and the overcoming of elastic limits which may cause the cut to be deeper than desired, even though the adjustments are within small or fine amounts. Also, it may be considered to be difficult to terminate a cut in a sole of an irregular peripheral shape an even distance inwardly from the edge without change of the cutter for performing this operation; and in order that these difficulties may be overcome I have provided a reciprocating single blade cutter which performs a single cut while the work is fed beneath it, certain definite amounts each reciprocation of the cutter; and I have arranged a support for the work which will cause the work to be cut at the supported areas and uncut at the unsupported areas so that I may cut or leave uncut any portions which I desire, even though the knife contacts these portions in its reciprocating stroke; and the following is a more detailed description of the present embodiment of this invention, illustrating the preferred means by which these advantageous results may be accomplished.

With reference to the drawings, 10 designates the shoe sole which is formed of soft, solid rubber, having the flexibility and thickness commonly used in making rubber soled shoes. The rubber is first molded or calendered to provide a sheet of the required thickness and is then partly cured and rough cut into the shape of the sole.

The knife for performing the cuts is designated 11, the uncut area is designated 12. This knife is reciprocated against the shoe sole and as it is desired that the cuts 13 terminate short of the peripheral edge 14 to leave an uncut area 15, I provide an anvil or support 16 which will support the sole only in the desired area to be cut. As shown in Fig. 2 the anvil 16 is the same shape as the shoe sole 10, but smaller than the shoe sole 10 by an amount sufficient to equal the uncut marginal edge of area 15, and is positioned beneath the sole 10 in the position shown by the dotted lines in Fig. 2 and also as illustrated in Fig. 3, so that as the cutter 11 descends the portion above the anvil 16 which is supported will be cut while the marginal edges 15 being unsupported will be flexed downwardly as illustrated in Fig. 6, so that the cutter will not enter this part of the material and thus due to its extreme flexibility will be pushed downwardly and remain smooth or uncut and intact. After each reciprocation of the knife 11, the sole 10 and anvil 16 are fed or advanced in the lengthwise direction of the sole in respect to the knife. Of course either the knife 11 or the sole and anvil 16 may be advanced so that they are fed relatively in respect to one another to form the individual cuts.

In order that the cuts may be better performed the knife is moistened with a mixture of water and alcohol, water glass, or some dilute alkali solution.

In order that a wavy cut may be provided the knife 11 is wavy and sharpened on both sides to provide a cutting edge 17, see Fig. 5, the wavy edge being of the character of a pinking knife which may be used for cutting cloth, the edges being readily sharpened should they become dull, and this edge enters the shoe sole to a certain required depth which may be calculated upon the compression and elasticity of the material and its density so that the cutter may be set accordingly, and when withdrawn leaves a clean cut so that the cut surfaces come back together again as no material has been removed. Thus, the sections present a rather smooth surface although a line may be seen across where the cut has been performed.

After the sole is formed it is dusted with talc, soapstone or the like and assembled on the shoe where it is vulcanized thereto. The talc or the like serving to prevent the cut surfaces from becoming vulcanized together, and while sometimes they may stick they will readily pull apart upon flexing. As the sole is used the sections flex something after the manner shown in Fig. 7 to expose their corners and provide a good gripping surface upon the supporting surface to be contacted.

Fig. 8 illustrates a shoe sole 20 which has been cut in an irregular area 21 on an anvil 22 of substantially the same irregular shape. In this case the knife 11 extends over the edge 22 of the anvil 23, and the sole and anvil is fed in a lengthwise direction relatively to the knife 11 after each successive reciprocation as in Fig. 2. An irregular uncut margin 24 results.

Figure 9:
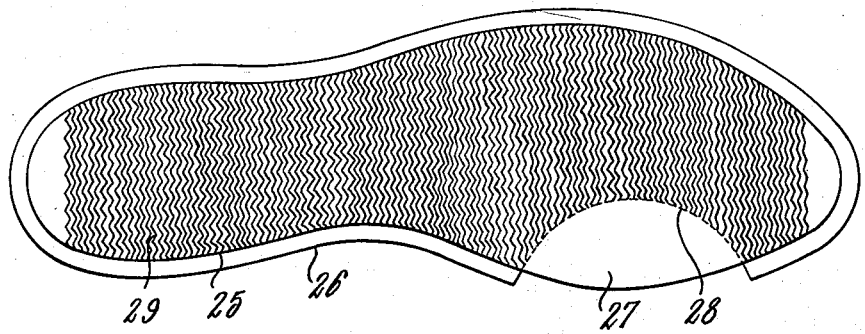
Fig. 9 is a plan view of a cut shoe sole and an anvil which supports the sole, except within the area defined by the dotted line and the full line of the edge of the sole when the sole is being cut.

Fig. 9 illustrates a shoe sole 25 which has been cut on an anvil 26 which overlaps the sole or at least extends to the edge of the sole except in the crescent shaped uncut area 27 of the sole, the crescent shaped edge 28 of the anvil being indicated by the dotted line which substantially coincides with the line between the cut area 29 of the sole and its uncut area. The knife 11 is operated in this case as previously described so that it extends over the edge of the sole.

The foregoing description is directed solely towards the construction illustrated, but I desire it to be understood that I reserve the privilege of resorting to all the mechanical changes to which the device is susceptible, the invention being defined and limited only by the terms of the appended claims.

This application contains the subject matter of my abandoned application Serial No. 158,711 filed August 12, 1937.

Having thus described my invention, what I claim and desire to protect by Letters Patent is:

1. The method of slitting an elastic shoe outsole comprising placing an anvil beneath the sole of a similar shape but smaller than the sole, intermittently feeding the sole and anvil relatively in respect to a knife, reciprocating said knife of a length extending beyond said anvil into the sole while on said anvil and when not in motion to extend the cut at right angles to the outer surface of the sole and but partially through the sole at each reciprocation and to repeatedly cut the same at spaced intervals to provide sections between the cuts and uncut portions at locations other than at the anvil.

2. The method of slitting a solid, soft, flexible rubber or rubber composition shoe outsole in some areas and not in others comprising placing an anvil underneath the sole which supports some areas and not others, intermittently feeding said anvil and said sole relatively in respect to a knife, reciprocating said knife of a length extending beyond said sole and beyond said anvil in the uncut areas of said sole into the sole while on said anvil, and when not in motion, to extend the cut at right angles to the outer surface of the sole and but partially through the sole at each reciprocation and to repeatedly cut the same at spaced intervals to provide sections between the cuts and uncut portions at locations other than at the anvil.

PAUL A. SPERRY.